T. N. HOWELL,

Assignor to J., W., A. C. and J. W. RICE.

Grave Torpedo.

No. 9,719. Reissued May 24, 1881.

WITNESSES=

Jas. E. Hutchinson.

J. A. Rutherford

INVENTOR.

Thos. N. Howell, by James L. Norris.

Attorney.

N. PETERS, Photo-Lithographer, Washington, D. C.

UNITED STATES PATENT OFFICE.

THOMAS N. HOWELL, OF CIRCLEVILLE, OHIO, ASSIGNOR TO JAMES RICE, WILLIAM RICE, ANTHONY C. RICE, AND JOHN W. RICE.

GRAVE-TORPEDO.

SPECIFICATION forming part of Reissued Letters Patent No. 9,719, dated May 24, 1881.

Original No. 217,379, dated July 8, 1879. Application for reissue filed October 8, 1879.

*To all whom it may concern:*

Be it known that I, THOMAS N. HOWELL, of Circleville, in the county of Pickaway and State of Ohio, have invented a new and useful Improvement in Grave-Torpedoes, of which the following is a specification.

This invention relates to certain improvements in torpedoes for the protection of graves; and it has for its object to provide such a torpedo which will be simple in construction, and which may be adjusted and charged independently of the manipulation of the undertaker after the coffin has been deposited, thus insuring absolute safety in burying the corpse, and absolute safety against spoliation of the grave. The work of the resurrectionist has necessarily to be performed with the utmost speed in order that detection may be avoided, and for this reason the coffin is rarely taken from the grave, the earth being simply removed from above the same, and the corpse extracted by means of ropes properly secured around the same after displacing or breaking through the lid of the coffin.

It is desirable in a torpedo for the protection of a grave that means should be provided not only for safely burying and charging the said torpedo with the coffin, but also that provision should be made for discharging the torpedo before the coffin is reached, so as to preserve the same intact and prevent the mutilation of the corpse.

To this end the invention consists in a torpedo composed of a suitable shell adapted to be buried in the ground outside of a coffin, and provided with mechanism to explode a cap or other fulminating material to ignite the charge in the shell, said mechanism being connected with wires extending over and secured at points around the sides and ends of the coffin, by means of which said mechanism will be operated to explode the cap or fulminate when any of said wires are disturbed in attempting to approach the coffin by digging away the earth, as more fully hereinafter specified.

The invention embraces other features which will be fully explained in detail, and pointed out in the claims.

Figure 1:
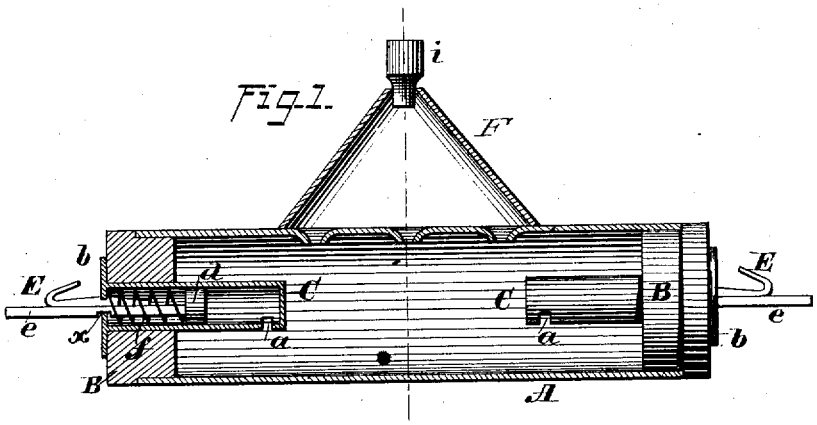
Figure 2:
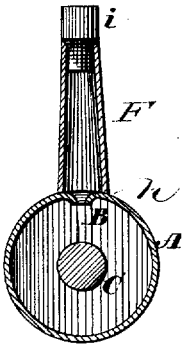
Figure 3:
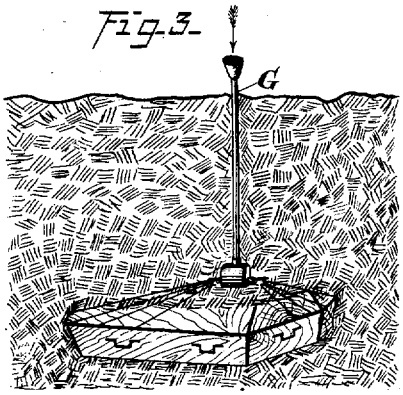

In the drawings, Figure 1 represents a longitudinal vertical section of my improved torpedo; Fig. 2, a central transverse section of the same; Fig. 3, a view showing the relative positions of the coffin, torpedo, and wires when buried.

The letter A designates a shell or casing of cylindrical or other suitable form, provided at the ends with heads B. Through each head extends a tube, C, having one or more perforations, *a*, near the inner end, the outer end of said tube being permanently fastened in the head or to a plate, *b*, attached to said head. In each tube is located a piston or plunger, *d*, provided with a rod, *e*, which has a notch, *x*, at a suitable point thereon.

Surrounding the rod *e*, between the piston *d* and the outer end of the tube, is a spring, *f*, as shown.

The letter E indicates a key to be inserted in the opening in the head or plate *b*, the office of which is to lock the piston-rod and piston in place when set to explode the cap, wafer, or fulminate, the said key being provided at its outer end with a hook or other suitable device for the attachment of one or more wires.

In the inner end of each tube C is to be placed a fulminating cap or wafer previous to setting each piston and piston-rod by means of the key E, which performs the office of a trigger. The torpedo is then placed in the grave with the coffin, with a few inches of earth between the torpedo and coffin, if desired. One or more wires are then to be fastened to each key or trigger E, and the said wire or wires extended over the coffin to the ends or edges of the same, where they are suitably fastened in any suitable manner, the whole being covered with earth, so as to be held in place.

The shell or casing is provided with a filling-opening communicating with the upper part of the said shell or casing, with which is adapted to be connected a detachable filling-pipe, G, extending to the upper surface of the earth above the grave, and through which the proper charge of powder may be filled into the shell or casing, the said removable pipe being adapted to receive a stopper, *i*, and direct it to the filling-opening of the shell, by which said shell may be closed, the filling-pipe being withdrawn after the charge is inserted, leaving the stopper in place to seal the shell. The filling-opening, as shown, consists of a cone-shaped chamber, F, arranged over a series of openings, *h*, extending through the shell or casing.

It will be perceived that the torpedo as thus constructed and applied is entirely detached from the coffin, and involves no manipulation in setting the torpedo until the work of the undertaker has been completed and the coffin has been deposited. Besides this advantage, which is important, it will be seen that any attempt to violate the coffin by resurrectionists will be frustrated before the coffin is reached, thus preserving the same intact and preventing any injury to the corpse from the explosion of the torpedo.

What I claim is—

1. A torpedo composed of a suitable shell adapted to be buried in the earth outside of a coffin, and provided with mechanism to explode a cap or other fulminating material to ignite the charge in the shell, said mechanism being connected with wires extending over and secured around the sides or ends of the coffin, by means of which said mechanism will be operated to explode the cap or fulminate when any of said wires are disturbed in attempting to approach the coffin by digging in the earth, substantially at specified.

2. The casing A, provided with funnel-shaped holes *h*, and the conical chamber F, surrounding the same and having an opening in the apex, for the purpose herein set forth.

3. The combination of the casing A, provided with funnel-shaped holes *h*, heads B, tubes C, having openings *a*, and spring-pistons *d*, keys D, and the conical chamber F, having an opening in its top, all substantially as and for the purposes herein set forth.

In testimony that I claim the foregoing I have hereunto set my hand in the presence of two witnesses.

THOMAS N. HOWELL.

Witnesses:
P. G. BOSTWICK,
J. A. LUTZ.